June 17, 1924.
G. G. SCHELTER
LAST MEASURING STICK
Filed Nov. 15, 1920
1,497,739
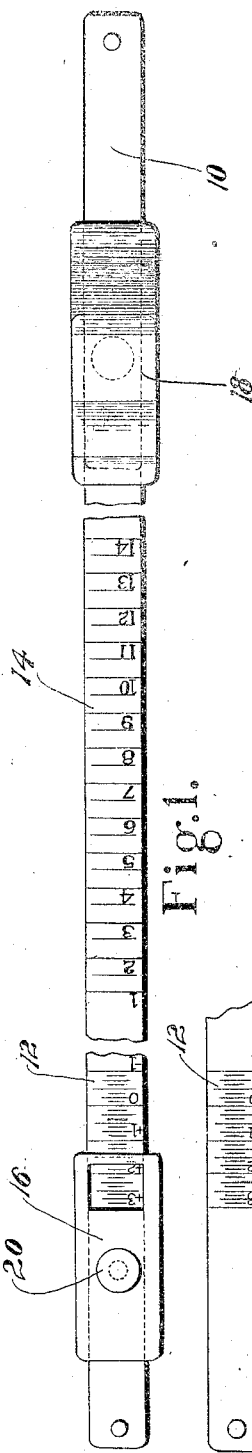
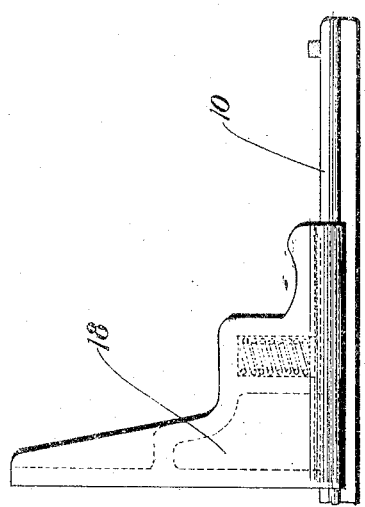
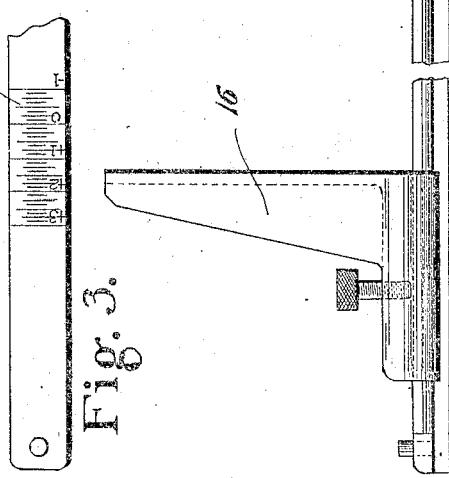
INVENTOR
George G. Schelter
By his Attorney
Nelson W. Howard Patented June 17, 1924.

1,497,739

UNITED STATES PATENT OFFICE.

GEORGE G. SCHELTER, OF ROCHESTER, NEW YORK, ASSIGNOR TO FITZ-EMPIRE DOUBLE PIVOT LAST COMPANY, OF AUBURN, MAINE, A CORPORATION OF MAINE.

LAST-MEASURING STICK.

Application filed November 15, 1920. Serial No. 424,232.

*To all whom it may concern:*

Be it known that I, GEORGE G. SCHELTER, a citizen of the United States, residing at Rochester, in the county of Monroe and State of New York, have invented certain Improvements in Last-Measuring Sticks, of which the following description, in connection with the accompanying drawings, is a specification, like reference characters on the drawings indicating like parts in the several figures.

This invention relates to instruments for measuring lasts and known as last measuring sticks, or more simply, as "last sticks."

The last stick as heretofore known comprises essentially a graduated bar having a perpendicularly upturned end and a slide having an arm extending parallel to the upturned end. The last being measured is placed on the stick and the slide brought up to grasp it between the arm and the upturned end, and the position of the slide, read on the graduation, gives the length of the last.

The unit of graduation is $\frac{1}{3}$ inch, according to the system of $\frac{1}{3}$ inch per size in use in this country. These graduation marks are numbered according to a standard system of lengths, wherein for example, the women's #4 is about $9\frac{2}{16}$ inches long. A #4 last with a pointed toe would be considerably longer than this, perhaps as much as two sizes. That is, most lasts will "stick" longer than their name-size.

In the last factory the operator who trims and shapes the ends of the lasts is responsible for their lengths. The ticket which comes with the lasts gives him the information for example, that the lasts have "$1\frac{3}{8}$ extension." This means that a last which is marked $6\frac{1}{2}$, for example, must "stick" $7\frac{7}{8}$. The operator is thus obliged to add $1\frac{3}{8}$ to all the marks on the lasts and test them on the stick which is ordinarily graduated in $\frac{1}{8}$ sizes. Errors are frequently made in this calculation, which has to be performed for every individual last.

It is a principal object of the present invention to remedy the difficulties above described, among others. Accordingly, I provide a stick having two graduated scales associated with it, one for the size reading and one for the extension. On the extension scale the associated arm can be set to the extension, once for all, and the other scale, which corresponds with the scale ordinarily found on the last stick, will be used exactly as heretofore, except that preferably it will be graduated only in sizes and half sizes, which are the only marks occurring on the lasts themselves. The operator can then check up the lengths by the simple and ordinary procedure of setting the corresponding marker on the regular scale to correspond with the marked sizes of the lasts, just as he would with an ordinary stick if the lasts were all standard. The extension scale will be graduated as finely as desired, for example in $\frac{1}{8}$ sizes, and have a range of perhaps 3 sizes up and one size down from the standard length. Thus one setting of the extension scale marker will suffice for the entire lot of lasts, and the operator is freed from the necessity of making calculations, and is obliged to read only sizes and half sizes.

Accordingly an important feature of the invention consists in a stick body having two sets of graduations and a marker or pointer associated with each set. One marker or pointer can thus be set for the extension, so that the other need only be used to read the marked lengths of the lasts.

This and other features of the invention, comprising certain combinations and arrangements of parts, will be understood from the following description of a preferred embodiment thereof selected for purposes of illustration and shown in the accompanying drawings in which, Fig. 1 is a plan of the stick;

Fig. 2 is an elevation; and

Fig. 3 is a plan of the short graduation.

The body 10 of the stick is a rod of any desired material and cross-section. These sticks are ordinarily made of wood, perhaps $\frac{1}{4} \times 1$ inches in cross section, but a light metal bar may be used in case rigid accuracy is desired. Near one end of the body 10 is graduated as at 12 preferably in $\frac{1}{24}$ inch divisions for about one inch and the graduation marks are numbered in $\frac{1}{8}$ inch units, the zero mark being placed perhaps a size from the end of the graduation nearer the farther end of the stick. This is because it is not so common for lasts to measure shorter than the marked size, and only one size is necessary to take care of these cases, as the under measurement is small, when it does occur. They may, however, run three sizes over, and the graduation 12 should provide for this.

The major part of the body 10 is graduated at 14 preferably in sizes and half sizes in the ordinary way, the end of the scale being at the zero mark of the scale 12. (The end of the ordinary last sizing scale is not at the end of its graduation, there being a minimum length of last beyond which the graduations are not continued.)

Two sliding fingers 16, 18 are arranged to move freely along the body 10 and the finger 16, at least, will be provided with a set screw 20 whereby it may be fastened in position.

The use of the stick is simple. The operator, told by his job-ticket that the lasts must all have "1⅜ extension" will set the finger 16 at 1⅜ on the scale 12, and then the finger 18 will read directly on the scale 14 the marked lengths of all properly made lasts of this lot. The operator's work is thus simplified, and the accuracy and reliability of his work enhanced.

Having described my invention, what I claim as new and desire to secure by United States Letters Patent is:—

1. A last measuring stick comprising a body graduated in ordinary last sizes, a member sliding along said body and reading against said graduations, and a second member also sliding along said body and operatively related to said first-named sliding member, the connection between the two sliding members comprising a second graduated scale and a relatively movable index mark, said last-named scale being only a few sizes long and arranged to read extensions relatively to normal size lengths.

2. A last measuring stick comprising a body, a member movable relatively to said body, one of said body and member being provided with a scale graduated in ordinary last sizes and the other of said body and member having a part reading against said graduations, and an abutment for contacting with the last to be measured, also movable relatively to said body and movably and operatively related to said first-named movable member, the operative connection between the said two movable members comprising a second graduated scale and a relatively movable index mark arranged to vary the distance between the two said movable members by the amount of extension of the last being measured over the standard length, one of said elements defined as movable relatively to said abutment member (the body and the member movable relatively to it) comprising a second abutment for co-operating with said first-named abutment member to measure the last.

3. A last measuring stick having a body and two caliper arms sliding thereon, one arm having associated with it an ordinary last sizing scale, and the other arm having associated with it a short scale only several sizes long with its zero mark at the end of the first-mentioned last sizing scale.

4. A last measuring stick having a body and two caliper arms sliding thereon, one arm having associated with it an ordinary last sizing scale graduated in sizes and half sizes only, and the other arm having associated with it a short scale only several sizes long and graduated in ⅛ sizes with its zero mark at the end of the first-mentioned last sizing scale, the short scale being graduated on both sides of its zero mark, and means for clamping in adjusted position the caliper arm associated with the short scale.

In testimony whereof I have signed my name to this specification.

GEORGE G. SCHELTER.